Aug. 21, 1923.
A. J. GRINDLE
DELIVERY TANK FOR POWDERED MATERIAL
Filed Feb. 4, 1922    2 Sheets-Sheet 2
1,465,665
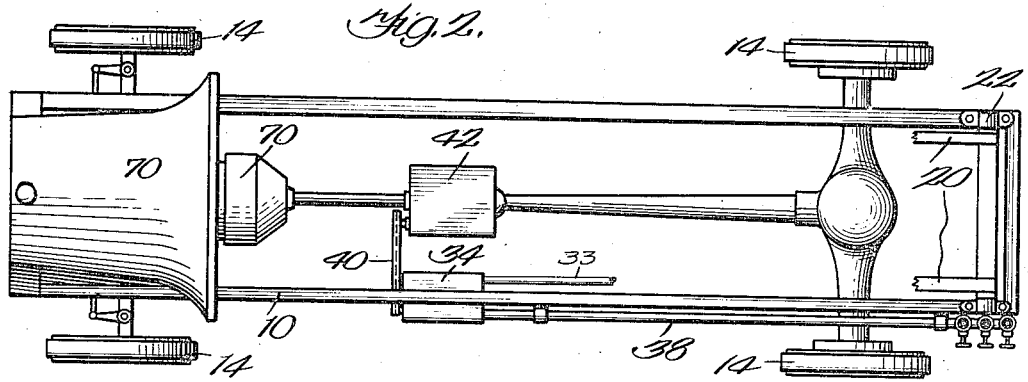
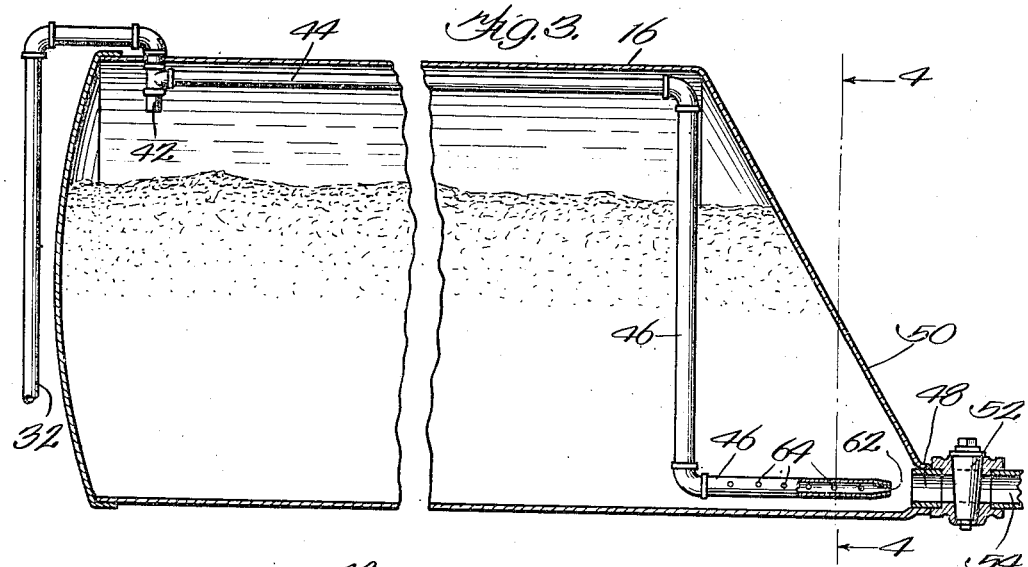
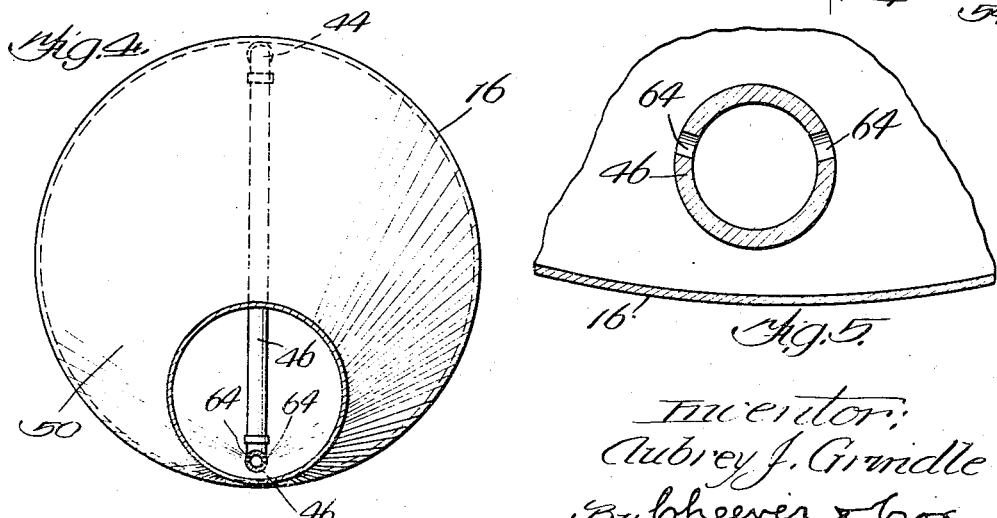
Inventor:
Aubrey J. Grindle
By Cheever & Cox
Attys Patented Aug. 21, 1923.

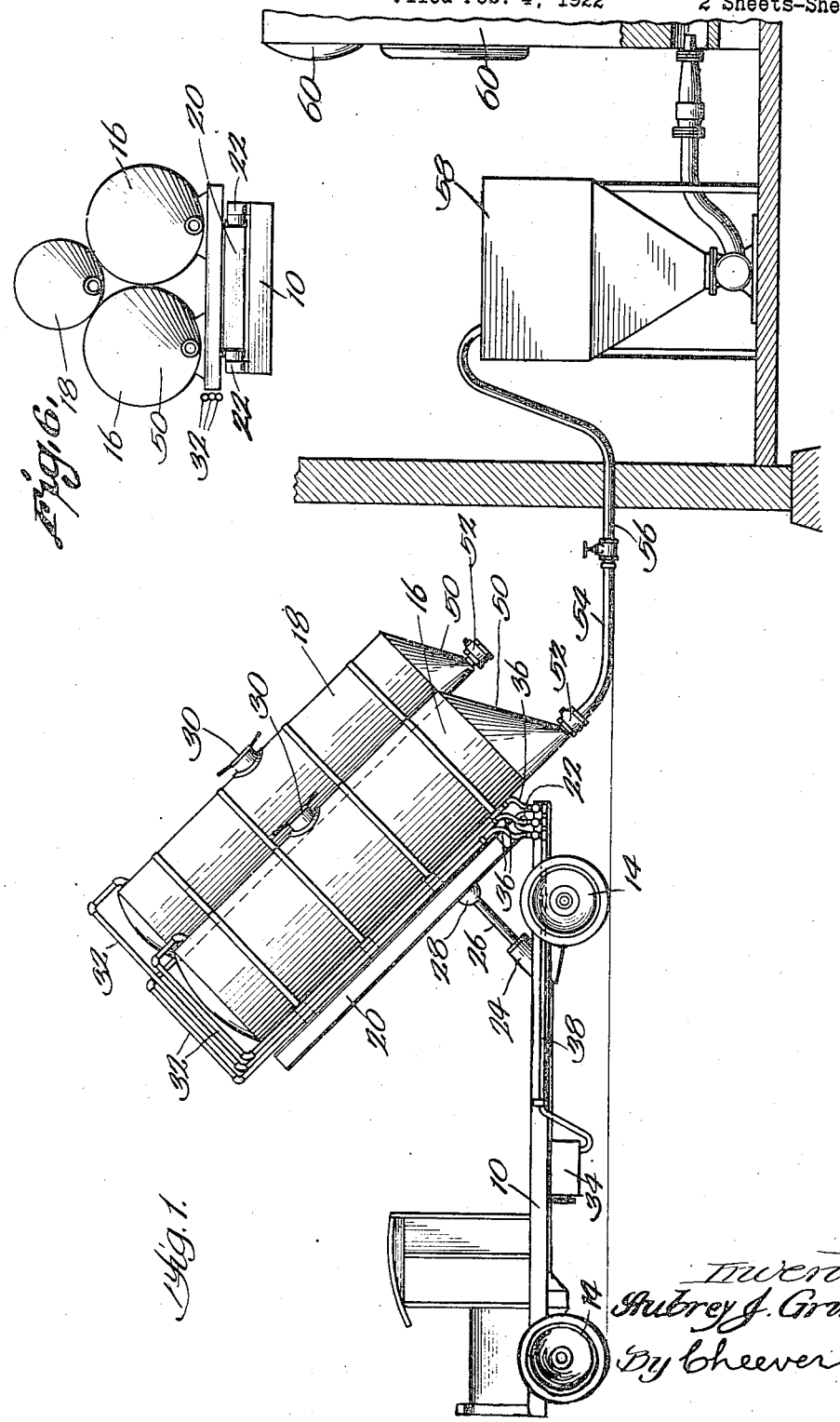

1,465,665

UNITED STATES PATENT OFFICE.

AUBREY J. GRINDLE, OF CHICAGO, ILLINOIS, ASSIGNOR TO GRINDLE FUEL EQUIPMENT COMPANY, OF HARVEY, ILLINOIS, A CORPORATION OF ILLINOIS.

DELIVERY TANK FOR POWDERED MATERIAL.

Application filed February 4, 1922. Serial No. 534,240.

*To all whom it may concern:*

Be it known that I, AUBREY J. GRINDLE, a citizen of the United States, residing at Chicago, in the county of Cook and State of Illinois, have invented a certain new and useful Improvement in Delivery Tanks for Powdered Material, of which the following is a specification.

This invention relates to means for taking powdered material, such for instance as powdered coal, from an initial source of supply, transporting it through the streets to a point of delivery, and unloading it in measured quantity without manual handling.

The object of the invention is to provide a truck mechanism equipped with tanks or other receptacles of measured capacity for retaining the powdered material and to provide manually controllable, but automatically operatable means for removing the powdered material from these tanks when the truck reaches the point where the powdered material is to be delivered, this more particularly when all the parts are combined in one machine freely movable about the public streets.

The invention consists in mechanism capable of attaining the foregoing objects, which is comparatively inexpensive to make, which is satisfactory and efficient in use, has a long life and is not readily liable to get out of order. More particularly the invention consists in material carrying tanks transportable by a truck, preferably an automobile truck, the same equipped with pneumatic mechanism energized by power carried by the truck, for aiding in forcing the powdered material from the tanks at the point of delivery, and to a reasonable distance from the point where the truck stops. The invention further consists in many features and details of construction which will be hereafter more fully set forth in the specification and claims.

Referring to the drawings in which like numerals of reference indicate the same parts throughout the several views—

Figure 1 is a side elevation of mechanism of this invention in the position which the parts assume in the act of delivering powdered material from one of the tanks carried by the truck to a customer's storage tank for powdered material, in the particular case here illustrated, powdered coal, designed to be used in an adjacent furnace;

Figure 2 is a plan view of the truck with the material carrying tanks removed therefrom;

Figure 3 is a sectional view of a tank removed from the truck, the central portion of the tank being removed in the operation of shortening up the drawing;

Figure 4 is a sectional end view on the line 4—4 of Fig. 3;

Figure 5 is an enlarged view of a section of the nozzle shown in Figure 4; and

Figure 6 is an end view of the truck showing three material carrying tanks.

When finely powdered material, as for instance, powdered coal, is transported in large quantities such as one or more tons, it cannot be unloaded by the ordinary tilt-up and slide-down method used in trucks of commerce to unload coarse coal, crushed stone and the like, this partly but not entirely because too much of the material would be blown away in the form of dust, thereby creating financial loss through waste and creating disturbance on the part of neighbors at the point of delivery. It is therefore necessary that such material be delivered in closed tanks, and the principal object of this invention is to provide means combined with a transporting truck mechanism which will more or less automatically remove finely powdered material from the closed tanks, without manual assistance. To this end the structure embodying the preferred form of the invention shown in the drawings, includes an ordinary commercial delivery truck frame 10, conventionally carried on traction wheels 14, the same equipped with a plurality, in the particular case here illustrated three, material tanks 16 and 18, the two former being preferably of larger capacity than the third, say two tons for each of the former and one ton for the latter. These tanks are rigidly connected to a supporting frame 20 pivoted to the main truck near its rear, at, say, 22. Suitably mounted on the frame of truck 10 is a piston 24 having a piston rod 26 pivotally connected to the frame 20 at a convenient point as 28, so that when air, under pressure, or other working material is provided in cylinder 24, the operator may, by mechanism not entering into this invention, tilt the frame 20 and attached cylinders 16 and 18, from the horizontal position in which the frame 20 is in practically the same horizontal plane as the main frame of the automobile 10, to the inclined position shown in Figure 1.

The cylinders 16 and 18 are identical in construction except possibly as to size, and are provided at a convenient point in their upper surfaces with a load receiving man hole 30 of conventional form through which the material to be carried may be charged in the ordinary manner at the initial source of supply. Each cylinder is also provided with a pressure pipe 32 adapted to convey compressed air or other similar material from a pump 34 or other suitable source of power located on the automobile. The connection between the individual pipe 32 on each cylinder and the pump is, as shown in the drawing, through an individual flexible pipe 36 adapted to allow for the tilting of the tanks, as described, these pipes all entering one common pipe 38 attached to the pump 34, as clearly shown in Figure 1. This pump 34 is preferably a positive pressure blower of commerce, driven by any convenient means, as for instance, a chain drive 40 operatively connected to the transmission mechanism 42 of the truck.

Each pipe 32 enters its particular tank near the forward or upper end of the tank as viewed in Figure 1, and there divides into a discharge port 42 for admitting air to the upper end of the tank, and a pipe 44 extending through the tank by any convenient route, to a nozzle 46 located adjacent to the material to be carried to delivery port 48 at the rear of the tank. This port 48 is preferably located in the more or less conical extension 50 on the rear of the tank designed, when the tank is tilted as shown in Figure 1, to guide material in the tank down to this discharge port 48. At the end of port 48 is a control valve 52 leading to a delivery hose 54 of any convenient length, in the particular case here illustrated adapted for attachment at its end to the intake pipe 56 of the material purchaser's storage tank 58 adjacent to his furnace 60, wherein the powdered coal supposed to be delivered is ultimately to be used.

The nozzle 46 is of peculiar construction, in that it is provided not only with an end port 62 of substantial size for the delivery of compressed air or the like in immediate proximity to discharge port 48, but it is also provided with a plurality of small side perforations 64 adapted to allow jets of air to escape into the conical member 50 and thus stir up the material to be delivered at that point, and thus prevent the clogging of the material immediately adjacent to the entrance of port 48.

In the operation of the mechanism, the tanks 16 and 18 are in horizontal position on the truck and are loaded at the source of supply through the manholes 30, thereupon the truck is driven in the ordinary manner to the place of delivery. The pipe 54 is then connected to the valve 52 of the selected tank 16 or 18 which is to be first discharged, and its opposite end is connected to intake pipe 56, as shown in the drawing, if such pipe 56 is provided, otherwise the free end of the pipe 54 may be led in through the window or other opening to the tank where delivery is to be made. In actual practice, this pipe 54 will operate successfully when it is made and carried several hundred feet in length, and it operates within proper limits equally well whether the point of ultimate delivery is considerably above or below the station of the truck when delivering material. Having thus connected up the pipe 54, the operator starts the compressor 34, opens valve 52 and starts manipulating the pressure in cylinder 24 (provided in any suitable manner not entering into this invention) to tilt the tanks upward to the position of Figure 1. As the tank being unloaded rises, the air pressure delivered by the pump or blower 34 travels through its particular pipe, part of it escaping through nozzle 42 into the space at the upper end of the cylinder which is above the material to be driven out of passage 48, the remainder of the compressed air or the like passing through pipe 44 to nozzle 46 and escaping through the side ports 64, to prevent the undue compression of the material to be delivered about the nozzle. Thus the material is allowed to flow freely to the end port 62 of nozzle 46 and to the entrance of port 48, at which point the air escaping from port 62 carries it through port 48 and valve 52 into pipe 56, through which it passes, under the pressure created, to the point of ultimate delivery, say the tank 58. With ten pounds of pressure at the upper end of the cylinder maintained by the air delivered by nozzle 42, very successful results have been obtained with this device delivering material as far as seven hundred feet from the tank.

In actual practice, with a truck capable of carrying five tons, it is convenient to have the two cylinders 16 each of two tons capacity and the cylinder 18 of one ton capacity, and thus delivery can be made in ton units ranging from one to five tons at a single trip of the truck.

The vehicle 10 shown is preferably an automobile truck having engine equipment 70 adapted to drive the truck through the streets.

In ordinary practice the cylinder 24 is operated by air from compressor 34; for instance, through pipe 33.

The term "compressed air" used in the claims includes any material under pressure capable of doing the work.

What I claim is:

1. In mechanism of the class described, in combination, an auto-motive vehicle, a tank for powdered material, carried by the vehicle, adjustable with reference thereto and having a discharge port, an air compressor carried by the vehicle, pipes leading from the compressor into said tank to air ports located respectively adjacent to the discharge port and adjacent to the opposite end of the tank, and means adjustably moving the tank with reference to the vehicle.

2. In mechanism of the class described, in combination, an auto-motive vehicle, a tank for powdered material, carried by the vehicle and having a discharge port, means for tilting the tank to move its discharge port downward, an air compressor carried by the vehicle, and pipes leading from the compressor into said tank to air ports located respectively adjacent to the discharge port and adjacent to the opposite end of the tank.

3. In mechanism of the class described, in combination, an auto-motive vehicle, a tank for powdered material, carried by the vehicle, adjustable with reference thereto and having a discharge port, an air compressor carried by the vehicle, pipes leading from the compressor into said tank to air ports located respectively adjacent to the discharge port and adjacent to the opposite end of the tank, the air ports adjacent to the discharge port including a nozzle having a large end port directed into the tank discharge port and a plurality of smaller ports (64) around the nozzle, the whole operative in all adjusted positions of the tank.

4. In mechanism of the class described, in combination, an auto-motive vehicle, a tank for powdered material, carried by the vehicle and having a discharge port, means for tilting the tank to move its discharge port downward, an air compressor carried by the vehicle, and pipes leading from the compressor into said tank to air ports located respectively adjacent to the discharge port and adjacent to the opposite end of the tank, the air ports adjacent to the discharge port including a nozzle having a large end port directed into the tank discharge port and a plurality of smaller ports (64) around the nozzle.

5. In mechanism of the class described, in combination, an auto-motive vehicle, a motor mechanism capable of propelling the vehicle, a tank for powdered material, carried by the vehicle adjustable with reference thereto, and having a discharge port, an air compressor carried by the vehicle, means by which the motor mechanism drives the compressor, and pipes leading from the compressor into said tank to air ports located respectively adjacent to the discharge port and adjacent to the opposite end of the tank, the whole operative in all adjusted positions of the tank.

6. In mechanism of the class described, in combination, an auto-motive vehicle, a motor mechanism capable of propelling the vehicle, a tank for powdered material, carried by the vehicle, and having a discharge port, means for tilting the tank to move its discharge port downward, an air compressor carried by the vehicle, means by which the motor mechanism drives the compressor, and pipes leading from the compressor into said tank to air ports located respectively adjacent to the discharge port and adjacent to the opposite end of the tank.

7. In mechanism of the class described, in combination, an auto-motive vehicle, a motor mechanism capable of propelling the vehicle, a tank for powdered material, carried by the vehicle, and having a discharge port, an air compressor carried by the vehicle, means by which the motor mechanism drives the compressor, and pipes leading from the compressor into said tank to air ports located respectively adjacent to the discharge port and adjacent to the opposite end of the tank, the air ports adjacent to the discharge port including a nozzle having a large end port directed into the tank discharge port and a plurality of smaller ports (64) around the nozzle.

8. In mechanism of the class described, in combination, an auto-motive vehicle, a motor mechanism capable of propelling the vehicle, a tank for powdered material, carried by the vehicle, and having a discharge port, means for tilting the tank to move its discharge port downward, an air compressor carried by the vehicle, means by which the motor mechanism drives the compressor, and pipes leading from the compressor into said tank to air ports located respectively adjacent to the discharge port and adjacent to the opposite end of the tank, the air ports adjacent to the discharge port including a nozzle having a large end port directed into the tank discharge port and a plurality of smaller ports (64) around the nozzle.

9. In the art described, a motor driven truck equipped with a tiltable material tank, a compressed air device for driving material in the tank out of it and means carried by the truck, selectively propelling it, tilting the tank, and driving the material from the tank.

10. In mechanism of the class described, a material tank having a conical portion terminating in a discharge port, a nozzle located inside said conical tank portion having an end port directed axially of the discharge port of the tank, and located back of the entrance to the discharge port, said nozzle having also smaller circumferential ports and means supplying compressed air to said nozzle.

11. In mechanism of the class described, a material tank having a conical portion terminating in a discharge port, a nozzle located inside said conical tank portion having an end port directed axially of the discharge port of the tank, and smaller circumferential ports and means supplying compressed air to said nozzle.

In witness whereof, I have hereunto subscribed my name.

AUBREY J. GRINDLE.